(12) United States Patent
Barker et al.

(10) Patent No.: US 9,115,879 B1
(45) Date of Patent: Aug. 25, 2015

(54) LIGHT TOWER

(71) Applicants: Page Barker, Dunlap, TN (US); Michael Thurman, Kennesaw, GA (US); Michael Douglas Zukowski, Signal Mountain, TN (US)

(72) Inventors: Page Barker, Dunlap, TN (US); Michael Thurman, Kennesaw, GA (US); Michael Douglas Zukowski, Signal Mountain, TN (US)

( * ) Notice: Subject to any disclaimer, the term of this patent is extended or adjusted under 35 U.S.C. 154(b) by 77 days.

(21) Appl. No.: 14/036,384

(22) Filed: Sep. 25, 2013

Related U.S. Application Data

(60) Provisional application No. 61/733,950, filed on Dec. 6, 2012, provisional application No. 61/705,814, filed on Sep. 26, 2012, provisional application No. 61/707,163, filed on Sep. 28, 2012, provisional application No. 61/707,153, filed on Sep. 28, 2012.

(51) Int. Cl.
*F21S 8/00* (2006.01)
*F21V 21/14* (2006.01)
*B60Q 1/24* (2006.01)

(52) U.S. Cl.
CPC .. *F21V 21/14* (2013.01); *B60Q 1/24* (2013.01)

(58) Field of Classification Search
CPC ............................ F21W 2131/10; F21V 21/22
USPC ................................................... 362/431, 485
See application file for complete search history.

(56) References Cited

U.S. PATENT DOCUMENTS

| | | | |
|---|---|---|---|
| 6,290,377 B1* | 9/2001 | Hulse ............................ | 362/385 |
| 6,692,142 B1* | 2/2004 | Gordin et al. ................. | 362/431 |
| 2010/0220489 A1* | 9/2010 | Konop ........................... | 362/428 |
| 2010/0232148 A1* | 9/2010 | Sharpley et al. .............. | 362/183 |
| 2012/0201016 A1* | 8/2012 | Robertson et al. ............. | 362/183 |

* cited by examiner

*Primary Examiner* — Evan Dzierzynski
(74) *Attorney, Agent, or Firm* — Stephen J. Stark; Miller & Martin PLLC

(57) ABSTRACT

A light tower has a mast, preferably provided in sections which can lift, some possibly with a rack and pinion system, and others possibly with a winch and pulley system. Some embodiments have a remote control to raise and lower the mast. Some embodiments have an array of lights atop the mast which can be rotated not only relative to horizontal light axes, but also relative to a horizontal array axis which is parallel to, but not collinear with, the horizontal light axes. Furthermore, some embodiments preferably provide at least one, if not a number of lights which can be unplugged from the array and connected into connections at the housing while still allowing for rotation of the lights (such as about horizontal and/or vertical axes).

14 Claims, 2 Drawing Sheets

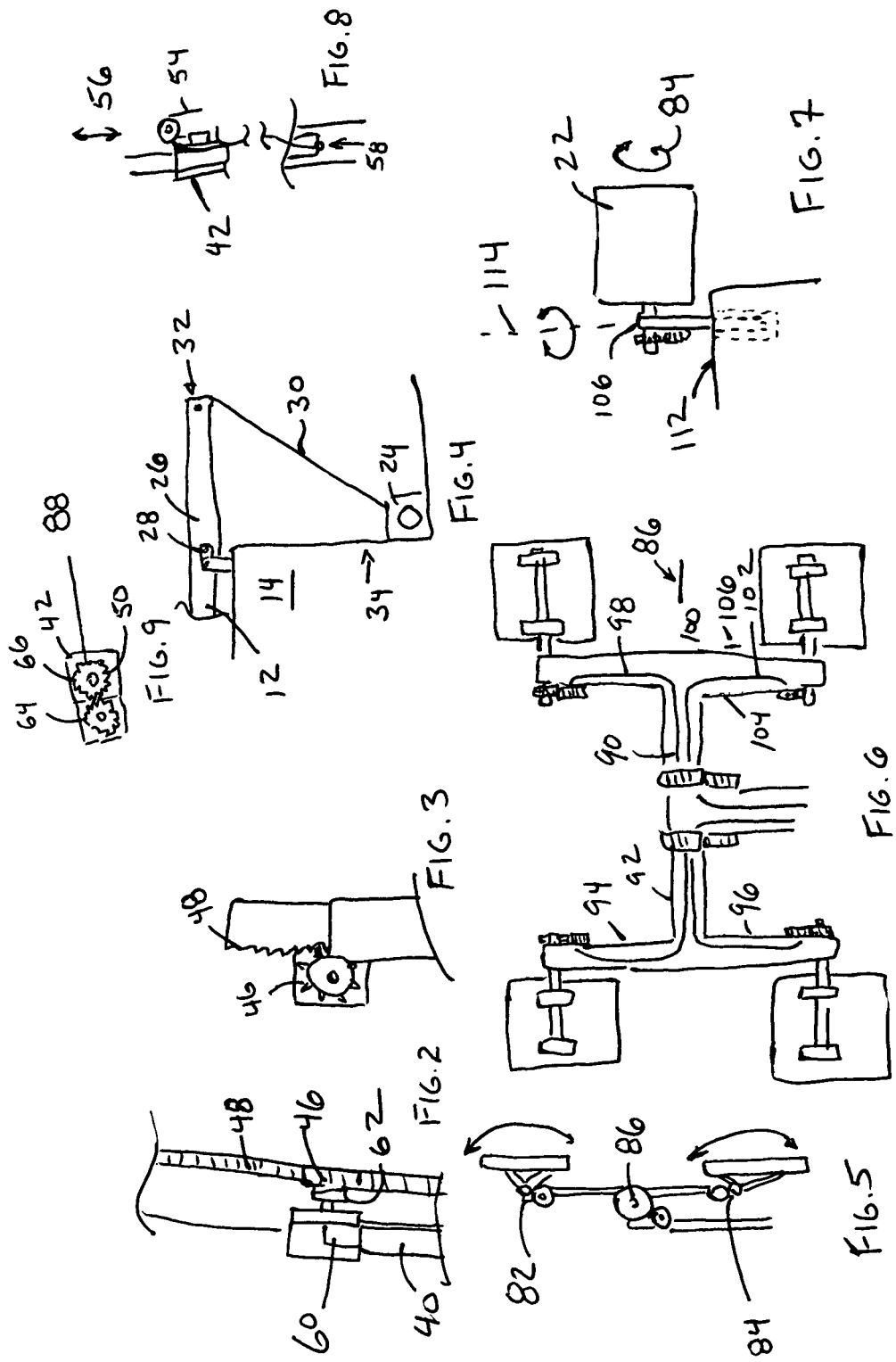

LIGHT TOWER

CLAIM OF PRIORITY

This application claims the benefit of U.S. Provisional Patent Application Nos. 61/733,950 filed Dec. 6, 2012, 61/705,814 filed Sep. 26, 2012, 61/707,163 filed Sep. 28, 2012 and 61/707,153 filed Sep. 28, 2012, all of which are incorporated herein by reference in their entireties.

FIELD OF THE INVENTION

The present invention relates to light towers, and more particularly to portable light towers used in the construction industry.

BACKGROUND OF THE INVENTION

Light towers have been utilized for many years. However, traditional light towers use lighting that is extremely hot at its surface. With new lower temperature LED lighting alternatives, new features may be possible or otherwise benefit from improved tower designs.

SUMMARY OF THE INVENTION

It is the object of the present invention to provide an improved light tower system.

It is another object of many embodiments of the present invention to provide an improved lighting tower system which has rotating lights which can rotate as an array relative to a mast.

It is another object of many embodiments of the present invention to provide an improved light tower wherein at least two of the lights can be removed from the tower mast and installed on a front portion of a trailer housing.

It is another object of many embodiments of the present invention to provide an improved mast lift system for a light tower.

It is an object of many embodiments of the present invention to provide an improved mast lift system such as one at least partially based on a rack and pinion system.

It is another object of many embodiments of the present invention to provide an electric winch system for lifting and/or raising a mast.

It is an object of the present invention to provide an improved light tower construction.

Accordingly, in accordance with a presently preferred embodiment of the present invention, a mast is provided, potentially connected to a trailer having, in which not only can the lights rotate about a center horizontal axis of the respective light fixtures like prior art designs, but also about an axis of at least a 1×2 (one or more horizontal at least, two vertical) array about the horizontal array axis. This capability is not believed to have been provided with multiple rows of lights with light towers in the prior art. Additionally, this capability cannot only provide a traditional configuration but also a street or security light configuration so that lights can face downwardly as an array (by rotating downwardly 90°), but also the lights can face forwardly or possibly rearwardly when the mast is down particularly if using LED light fixtures that would not present a significant safety hazard.

Additionally, at least one or two light fixtures can preferably be at least temporary removed from the array so they can be utilized as work lights such as by connection to a rear portion of the trailer housing to be used as work lights with LED fixtures. This also does not present the safety hazard as prior art designs could otherwise provide due to the significantly lower operating temperatures. The light fixtures can still be rotated about a center horizontal axis as well as possibly around a vertical axis. Meanwhile, the other lights (still attached to the mast) could be directed in an opposite direction or other direction. For what is believed to be the first time, 360° lighting capability can be provided by a single lighting tower system. Other advantages will likely be recognized by those of ordinary skill in the art of presently preferred embodiments of the present inventions.

A lift system for the mast is also provided which is believed to be novel over prior art designs. Instead of relying solely on cable lifts employed by manual winches for the entire system, at least one section can be lifted relative to another with a rack and pinion system. In fact, this system can be combined with an electrical lift system to utilize an electric driven pinion to drive a second section relative to a first section and then utilize an electric winch and cable system to lift additional sections to minimize the need for mechanical winches as have been utilized by many embodiments in the past. An electric winch could also be utilized to lift the mast from a horizontal storage configuration to a vertical configuration. Another electrically driven pinion can be used to rotate at least a portion of the mast and lights.

BRIEF DESCRIPTION OF THE DRAWINGS

The particular features and advantages of the invention as well as other objects will become apparent from the following description taken in connection with the accompanying drawings in which:

FIG. 2 is a side perspective view of a portion of the mast shown in FIG. 1;

FIG. 3 is a rear plan view of the portion shown in FIG. 2;

FIG. 4 is a rear view of a portion of the structure shown in FIG. 1;

FIG. 5 is a side plan view of an upper portion of the structure shown in FIG. 1;

FIG. 6 is a rear view of the portion shown in FIG. 1;

FIG. 7 is a front plan view of one of the lights removed from a location shown in FIG. 1 and attached to the housing at a mount as shown in FIG. 1;

FIG. 8 is a cutaway cross sectional view of a portion of the mast shown in FIG. 1; and FIG. 9 is a top view of a portion of the mast shown in FIG. 1.

DETAILED DESCRIPTION OF THE DRAWINGS

Figure 1:
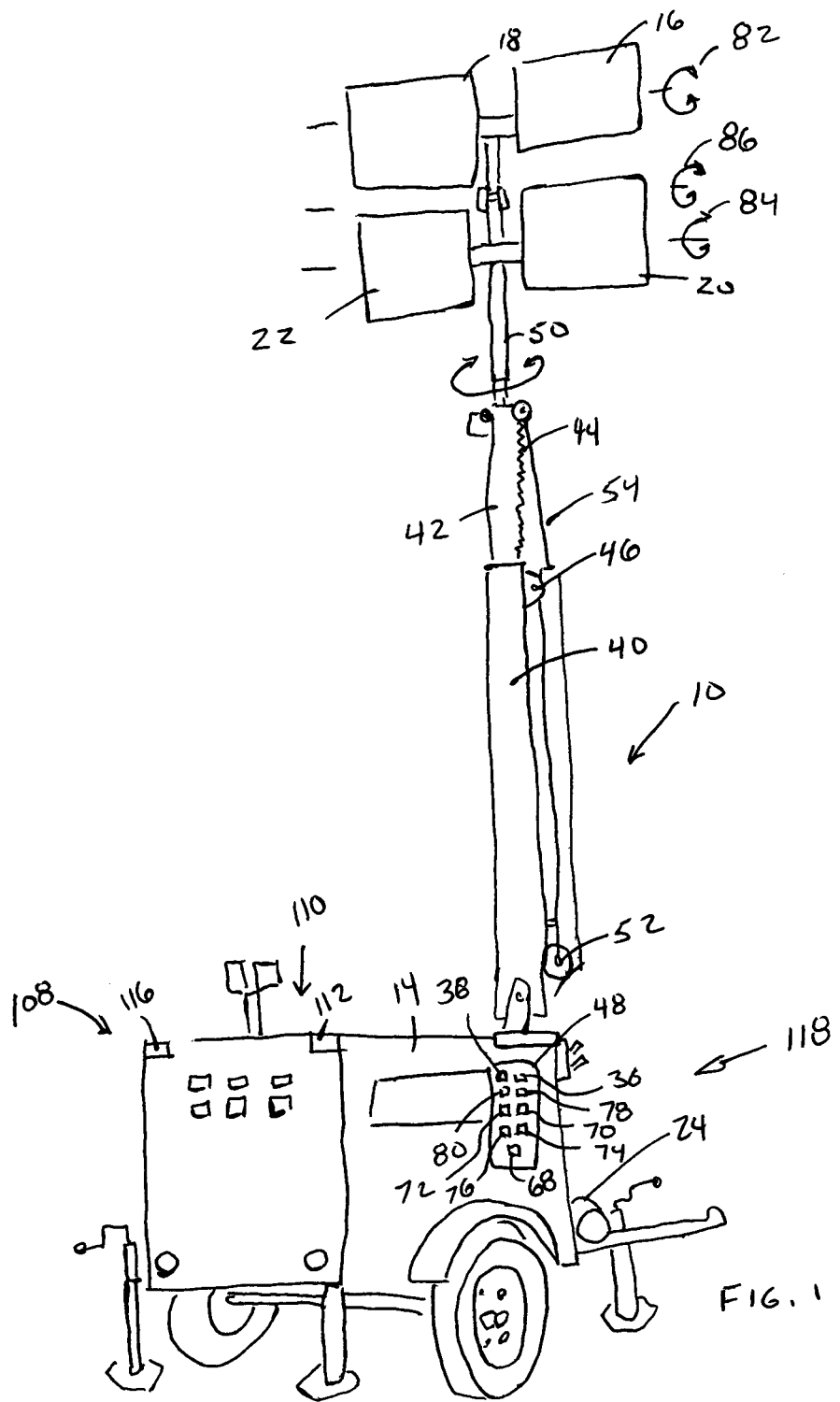
FIG. 1 is a front perspective view of the presently preferred embodiment of the present invention.

FIG. 1 shows a light tower 10 in accordance with the presently preferred embodiment of the present invention. Specifically, this light tower 10 has a mast 12 connected to a housing 14. The housing 14 traditionally houses power supply such as a generator and/or connections to shore power, battery backup, solar panels, connections to wind turbines or other power connections to be able to provide power to lights 16,18,20,22 which are preferably LED lights for at least a preferred embodiment. Other embodiments may have more traditional light sources for lights. While many light towers have been constructed with prior devices, none are believed to have all the features or even some of the features described herein.

Specifically, an electric winch 24 is useful to raise the mast 26 such as about pivot 28 for some preferred embodiments. Pivot 28 pulls cable 30. End 32 is brought to stop 34 and thus vertical orientation of the mast 12 can occur. Reversal of the process can lower the mast 26, particularly as it relates to housing 14. The raising and lowering process may be remote controlled such as at controller 36, with switch 38 or otherwise.

With the mast 12, or first mast section 40 elevated, second mast section 42 can then be elevated relative to first mast section 40 such as with a rack and pinion system with track 44 shown relative to geared pinion 46 which can elevate the second mast portion 42 relative to first mast portion 40. This can be controlled with switch 48 on controller 36. This is believed to be different from prior art systems. Next, the third mast section 50 may be lifted relative to second mast section 42 such as with a cable winch system as may be controlled by electric winch 52 with cable 54 or otherwise. Electric and particularly remote controlled systems are believed to be new.

FIG. 8 is useful to understand this as cable 54 is wound about the winch 52 it proceeds over pulleys 56 down towards the bottom 58 of the third mast portion 50 thereby lifting the bottom 58 of the third mast portion 50 upwardly relative to the second mast portion 42 onto which pulley 56 may be preferably mounted as is shown in FIG. 8. Other methods of lifting various mast sections relative to one another could be utilized in various other embodiments.

The second and third mast sections 14,15 may, or may not, be lifted completely to their highest elevated portion for all uses. In fact, there will be some embodiments in which the mast is even left in a horizontal position as shown in FIG. 4 to be discussed in further detail below. FIG. 2 is useful to show the operation of the pinion 46 against track 48 as a rack and pinion drive system which may be driven by motor 60 whether located connected to the first mast portion or other location may be connected at bearing 62 or otherwise to otherwise drive pinion 46 which then engages teeth in the track 48 to move it upwardly or downwardly as instructed by motor 60. Controller 48 may control the lifting of this. Once lifting the third mast portion 50 relative to the second mast portion to a desired amount, it may be possible to rotate the third mast portion 50 relative to second mast portion 42 such as by having gear 64 engage teeth 66 at a lower or other portion of third mast portion 50 so that it might be rotated with switch 68 on control panel 36 to control the rotation in a desired manner. Other rotation systems may be utilized with other embodiments.

Meanwhile, lights 16,18,20,22 could be rotated with controllers 70,72,74,76 as desired for about their respective horizontal axes shown as axes 78,80. Prior art designs will also rotate about the horizontal axis of each of the various lights within those designs. What separates this design from others is that in addition to those capabilities, using switch 78 the array which is preferably at least a 1×2 array, if not a 2×2 array, can be rotated about a horizontal array axis 86 which may be perpendicular to the axes 82,84 but is not collinear with either one of them in the preferred embodiment. Applicant defines the array as at least 1×2, meaning non-collinearly horizontally aligned lights. At least one horizontal x at least two vertical electrical connections can be carried by conduit 88 through the mast portions 40,42,50 as shown in FIG. 9 and then split into two connector portions 90,92 which separately can split into portions 94,96,98,100 or otherwise to provide electrical power to the lights 16,18,20,22 when installed as shown in FIG. 1.

Not only can lights 16,18 rotate about horizontal axis 82, lights 20,22 and rotate about horizontal axis 82, but all four lights 16,18,20,22 illustrated can also rotate about array axis 86 as shown in FIGS. 1, 5 and 6. Array axis 86 is shown as non-linear but parallel to horizontal axes 82,84. No other known light tower can allow for such rotation while allowing individual lights 16,18,20 or 22 to also be rotated abut their respective axes 82 or 84. The array can be rotated to be straight up, straight down (for a street light configuration), etc. Virtually 360° of positioning capability is now possible for not only 16,18,20,22 about axes 82,84 but for all the lights in an array about axis 86. Controllers 70,72,74,76 can allow for the rotation of lights 16,18 about horizontal axis 82 as well as lights 20,22 about axis 24 while controller 68 may allow for the rotation of the array about array axis 86. In this embodiment, all the lights 16,18,20,22 may rotate as such, but for other embodiments, it may be fewer or more about array axis 86.

Meanwhile, controller 80 can also allow for control of rotation if not done at switch 68. FIG. 6 shows how post 102 can be connected at base 104 by sliding the post 102 from base 104 after disconnecting the connector 106 as would be understood by those of ordinary skill in the art particularly with plug in electrical connections. By removing connector 106, the post 102 may be removed from the base 104 and then installed on the housing 14 such as near the rear end 108 which is on a top 110 in a mount 112 as shown in FIG. 3. Controller 76 can control the rotation about the horizontal axis 84 which has not changed for this process. Light 22 may also be possible to manually or otherwise rotate the light 22 about vertical axis 114 as would be understood by those of ordinary skill in the art. This way, since the lights 16,18,20,22 do not reach dangerous of temperatures of prior art lighting, the lights such as 16,18,20,22 may be installed on mounts 112 or 116 or other mounts provided on the housing 110. This way the array could be rotated so that the remaining two lights could be directed towards a front 118 of the housing 14 and another two light or lights could be directed towards the rear for a 360° coverage by a single light tower. This is not possible with prior art designs. Other orientations would also be possible.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A light tower comprising:
   a mast connected to a housing supported by a trailer, said mast having a raised configuration with the mast oriented vertically and a storage configuration with the mast oriented horizontally;
   lights provided at at least in a 1×2 array with a first light located above a second light supported by a frame and each light respectively rotatable relative to the frame about a horizontal light axis, and
   a horizontal array axis parallel to and non-collinear with any horizontal light axis, said frame supporting the array rotatable about the horizontal array axis.

2. The light tower of claim 1 further comprising a remote control, said remote control remotely operating the winch to raise and lower the mast.

3. The light tower of claim 1 wherein the mast further comprises first and second mast sections, said second mast section raising relative to the first section with a rack and pinion system.

4. The light tower of claim 3 wherein the mast further comprises a third mast section, and said third mast section raising relative to the second mast section with a winch pulling on a second cable.

5. The light tower of claim 4 further comprising a remote control, said remote control controlling rotation of at least a gear for raising the first section relative to the second system with the rack and pinion system.

6. The light tower of claim 4 further comprising a pully on the second mast portion through which the second cable pulls the third mast portion relative to the second mast portion.

7. The light tower of claim 3 further comprising a remote control, said remote control controlling rotation of at least a gear for raising the first section relative to the second system with the rack and pinion system.

8. The light tower of claim 3 further comprising a motor connected to first mast section and a rack of the rack and pinion system connected to the second mast portion.

9. The light tower of claim 3 further comprising a remote control, said remote control controlling rotation of at least a gear for raising the first section relative to the second system with the rack and pinion system.

10. The light tower of claim 1 wherein the mast further comprises a third mast section, and said third mast section raising relative to the second mast section with a winch pulling on a second cable.

11. The light tower of claim 1 wherein the array is rotatable about the horizontal array axis with at least one controller connected to the housing.

12. The light tower of claim 1 wherein a first light is detachably connected to the array in an array configuration and is removable from the array at a connection and received in a receptacle on the housing in a housing configuration with the first light selectively energized in the housing configuration.

13. The light tower of claim 12 wherein the first light is rotatable about a horizontal light axis when connected to the housing.

14. The light tower of claim 13 wherein the first light is rotatable about a vertical light axis when connected to the housing.

\* \* \* \* \*